June 21, 1966        D. J. DEAN        3,256,774
ELECTRICALLY OPERATED VISUAL DISPLAY DEVICE
Original Filed May 4, 1962        2 Sheets-Sheet 1
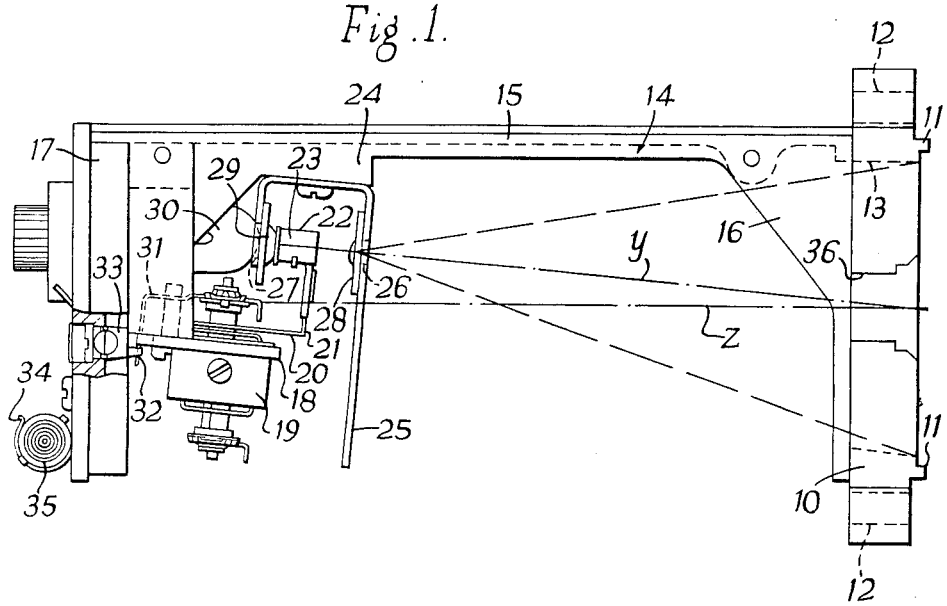
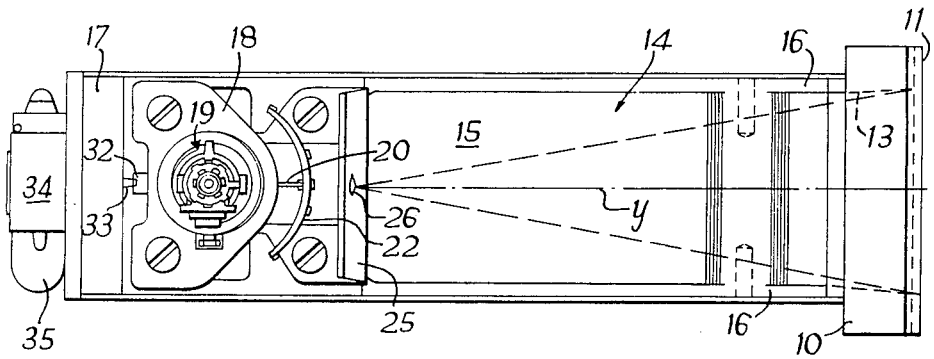
INVENTOR
Derek John Dean
ATTORNEY

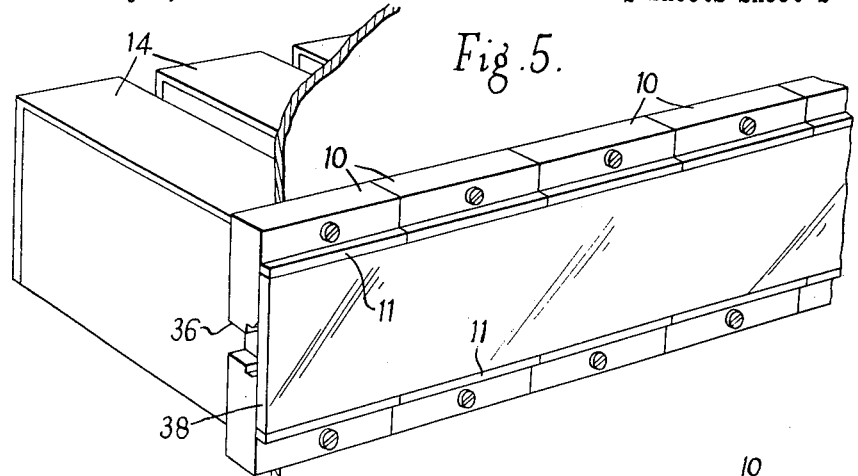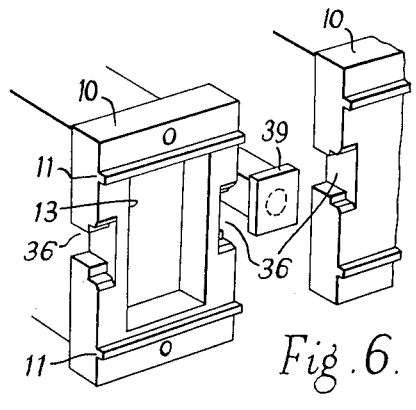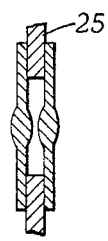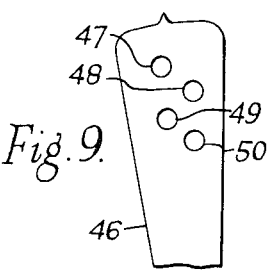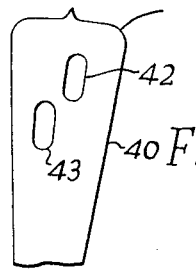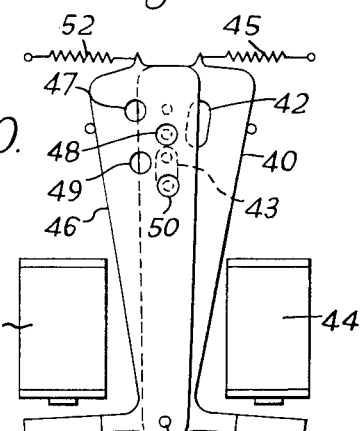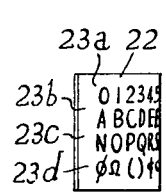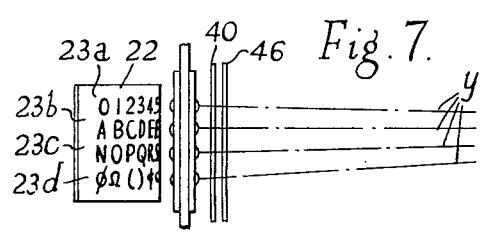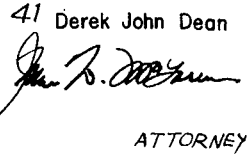

3,256,774
ELECTRICALLY OPERATED VISUAL
DISPLAY DEVICE
Derek John Dean, Potters Bar, Middlesex, England, assignor to Weston Instruments, Inc., a corporation of Texas
Continuation of application Ser. No. 192,408, May 4, 1962. This application June 21, 1965, Ser. No. 470,309
6 Claims. (Cl. 88—24)

This is a continuation of application Serial No. 192,408, filed May 4, 1962, now abandoned.

This invention relates to electrically operated indicating devices and is more particularly concerned with an improved form of device suitable for providing a visual display of any chosen one of a number of different indications, such as numerals, at a common position on a display screen. A particular application of the invention is to digital read-out devices for computing and like equipment.

The construction according to the invention is one including means for mounting a translucent front display screen, said means being attached to a rearwardly extending supporting frame at the rear end of which is secured a mounting member carrying a moving coil type meter movement, the moving coil element of which movements supports an arcuate scale strip bearing a succession of different display indications, e.g., numerals and/or letters, said arcuate strip being movable in between a projection lens positioned in front of said scale strip and a condenser lens located behind said scale strip, the rear mounting member also serving to support an electric lamp bulb positioned behind said condenser lens in a forwardly directed aperture in said mounting member, said mounting member also carrying a zero adjusting mechanism arranged to co-operate with the zero adjuster arm of the moving coil movement. In a preferred form the axis of the moving coil system is inclined somewhat to the vertical whereby the main beam axis of the optical system is inclined at a small angle with respect to the normal at the projection screen.

In order that the above and other features of the invention may be more readily understood a number of constructional embodiments thereof will now be described by way of illustrative example and with reference to the accompanying drawings in which:

FIGURE 1 is a side elevational view of one practical form of the invention as applied to a digital read-out device for a computer or the like;

FIGURE 2 is an underside plan view of the device of FIG. 1, an external cover plate being removed in each of the views;

FIGURE 3 is a side elevational view of an alternative form of lens which may be used for either or both of the condenser and projection lens system;

FIGURE 4 is a part-sectional side elevational view of another alternative lens system;

FIGURE 5 is a perspective view illustrating the manner of assembling several similar devices to form a multi-character display device;

FIGURE 6 is a fragmentary perspective view illustrating the manner of arranging a decimal place indicating lamp in a multi-character display device as shown in FIG. 5;

FIG. 7 is a fragmentary and enlarged scale side elevation of a modified arrangement for providing selection from a plurality of different rows of display symbols;

FIGURE 8 is a fragmentary front elevation of the arrangement of FIG. 7 while;

FIGURES 9 and 10 are detailed views of the respective shutter plates of, the arrangement of FIGS. 7 and 8.

Referring first to FIGS. 1 and 2 the device shown comprises a front mounting plate 10 provided with horizontal ribs 11 on its forward surface for receiving and supporting a translucent screen plate. Such screen plate is conveniently made of acrylic resin material and is preferably provided on one surface with a ground or mat surface. The plate 10 is provided with a pair of spaced holes 12 for effecting mounting of the device upon the rear or the front surface of a panel or the like and is also formed with a central viewing aperture 13 of approximately rectangular shape. This plate 10 is secured to or, more preferably, is formed integrally with the forward end of a moulded or die-cast framework 14 having a main horizontal rearwardly extending upper limb 15 and a pair of downwardly directed front arms 16 lying one on each side of the viewing aperture. To the rear end of the limb 15 is secured a mounting member in the form of a block 17, preferably of moulded insulating material.

To this mounting block 17 is secured a metal mounting plate 18 forming a forwardly directed platform carrying a moving coil type instrument movement 19 of any convenient form but preferably of small size. This movement is disposed with its spindle axis normal to the plane of the plate 18, i.e., nearly vertical; while to the moving coil element of this instrument movement is secured a radially extending scale carrier arm 20, preferably of aluminum, said arm having an upwardly directed forward end 21 to which is secured an arcuate scale strip 22 upon which are disposed a number of characters 23, such as the digits 0, 1 . . . 9, which are to be displayed. The strip 22 is preferably opaque except for the display characters which are transparent but the alternative of opaque characters upon a transparent strip may be employed, if desired. Similarly, coloured characters or strip may be used. The scale strip with its characters is preferably formed by a photographic method.

To a mounting block 24 projecting downwardly from and forming part of the aforesaid upper limb 15 of the framework 14 is secured an inverted U-shaped member 25 of strip metal having aligned apertures 26, 27 in the opposite limbs thereof. In register with the forward aperture 26 and on the rearward surface of the front limb of the member 25 is mounted a projection lens 28. The projection lens, which may be of a plano-convex type, is preferably formed by moulding acrylic resin. On the forward surface of the rear limb of such member 25 is mounted a condenser lens 29, preferably also of acrylic resin, and again of plano-convex form. The optical axis y of the two lenses coincides with the center line of the row of characters 23 of the scale strip 22 so that as the latter is moved angularly upon energization of the moving coil, any one of the characters may be brought into alignment with such optical axis.

Behind the condenser lens 29 is disposed a light source in the form of a small incandescent electric lamp bulb 30 mounted in a suitable aperture in the mounting block 17 and readily removable therefrom in a rearward direction. The zero adjuster system 31 of the moving coil meter movement 19 includes a downwardly directed arm 32 of slotted form. The slot of this limb is engaged by an eccentric pin carried by the end of a zero adjuster stud 33 rotatably mounted in the said mounting block 17 and also accessible from the rearward side of the latter.

As shown, the main axis y of the optical system lies at an angle of some 5° to the horizontal normal z from the center point of the front screen aperture. Such slight inclination permits the vertical dimension of the device to be reduced to a minimum value. A sheet metal protective screen of U-form in transverse section is preferably provided to cover the two vertical sides and the lower horizontal side of the space between the front plate 10 and the rear mounting block 17. Sealing means e.g., in the form of a resilient foam rubber or plastic strip located between the abutting surfaces of the screen and the edges of the blocks 10 and 17 and the projection lens mounting member 25 is preferably provided to prevent ingress of foreign matter, such as dust, to the moving coil mechanism and to the rearward surface of the translucent screen plate. The mounting block 17 is conveniently also provided with clip means 34 for carrying a spare bulb 35.

In the use of such device, the application of different appropriately stepped values of current to the moving coil 19 will result in deflection of the moving coil system and corresponding angular movement of the scale strip 22 to any one of a number of different positions which may, by appropriate choice of current value, be caused to align respectively with the optical system axis y thereby to cause projection of the particular character 23 lying in the optical projection path on to the forward projection screen.

When a series of similar devices are mounted in line as shown in FIG. 5 to display a multi-character display, a common screen plate 38 of elongated strip form may be mounted in the single slot formed by the aligned ribs 11 of the various devices. A recess, as shown at 36, is preferably formed at each side of the front plate 10 of each device to provide for the mounting of a decimal place indicator lamp between one or, if desired, each pair of indicator devices. As shown in FIG. 6, such decimal place indicator lamp 39 is attached to one side of one of the two abutting indicator devices so that it appears in the aperture formed by the adjacent recesses 36.

Various modifications may obviously be made. For example, the scale strip 22 may be of increased width as shown in FIGS. 7 and 8 to accommodate two, three, four or more separate rows 23a, 23b, 23c, 23d of display symbols, each row being associated with an individual optical system of condenser and projection lenses arranged to project any chosen one of the symbols of the related row onto the same area of the single front screen plate. Selection of the required one of the rows of display symbols may then be effected by means of one or more movable shutters in front of the projection lens. Such shutter may be arranged for manual operation or for remote control by electromagnetic or other means.

One shutter arrangement is shown more clearly in FIGS. 7–10 in which a first shutter plate 40 pivoted at 41 is provided with two displaced apertures 42, 43 which can be brought alternatively into register with the optical systems for character rows 23a, 23b or 23c, 23d by rocking movement of the shutter plate by means of electromagnet 44 and return spring 45. A second overlying shutter plate 46 also pivoted at 41 is provided with two mutually displaced pairs of apertures 47, 48 and 49, 50 which can be brought alternatively into register with the optical systems for character rows 23a, 23c or 23b, 23d by rocking movement of the shutter plate by means of electromagnet 51 and return spring 52. According to the positioning of the shutter plates 40, 46, any chosen single one of the rows of characters may be projected on the viewing screen under selection control by the degree of energization of the moving coil meter movement.

The condenser and/or projection lens systems may be modified as desired. For instance, as shown in FIG. 3, the respective lenses may be of double convex form while, if desired and as shown in FIG. 4, the projection and/or the condenser lens system may comprise two double convex or other form lens elements mounted one on each side of its supporting plate.

What is claimed is:

1. An electrically operated visual display device comprising: a support frame having an apertured front wall and a rearwardly extending limb; an instrument movement having a moving coil and being supported on said rearwardly extending limb, said moving coil being provided with an arcuate projection scale strip defining at least one row of separate projection characters; a projection lens system and a projection lamp, said projection lens system being supported by said rearwardly extending limb and being disposed between said scale strip and said apertured front wall; a rear wall member secured to and disposed at right angles to said rearwardly extending limb, said instrument movement being mounted upon said rear wall member; a zero adjuster member coupled to said coil for positioning said scale relative to said front wall, said adjuster member projecting rearwardly from said rear wall member; and a condenser lens system supported on said rearwardly extending limb and disposed between said scale strip and said projection lamp for optically projecting at least one of said separate projection characters onto a viewing screen through the aperture of said front wall, said separate projection character representing the magnitude of a current applied to said instrument movement.

2. A measuring instrument including a plurality of visual display devices, each display device comprising: a support frame having an apertured front wall and a rearwardly extending limb, said front wall being of rectangular form and being provided with spaced forwardly projecting parallel ribs for the reception of a translucent viewing screen plate, each side edge of said front wall being provided with a recess adapted to form, in combination with the corresponding recess in an abutting front wall of an adjacent display device, a receiving aperture for a decimal indicator lamp; an instrument movement having a moving coil and being supported on said rearwardly extending limb, said moving coil being provided with an arcuate projection scale strip defining at least one row of separate projection characters; a projection lens system and a projection lamp, said projection lens system being supported by said rearwardly extending limb and being disposed between said scale strip and said apertured front wall; and a condenser lens system being supported on said rearwardly extending limb and being disposed between said scale strip and said projection lamp for projecting at least one of said projection characters onto a viewing screen through the aperture of said front wall, said separate projection character representing the magnitude of a current applied to said instrument movement.

3. An electrically operated visual display device comprising: a support frame having an apertured front wall and a rearwardly extending limb; an instrument movement having a moving coil and being supported on said rearwardly extending limb, said moving coil being provided with an arcuate projection scale strip defining a plurality of parallel rows of separate projection characters; a projection lens system for each of said rows, each projection lens system being supported on said rearwardly extending limb for selectively projecting the characters of a single one of said rows; a shutter mechanism for masking all but a chosen one of said projection lens systems and being disposed between said scale strip and said apertured front wall; and a condenser lens system disposed between said scale strip and a projection lamp for projecting at least one projection character of a single row onto a viewing screen through the aperture of said front wall, said at least one projection character representing the magnitude of a current applied to said instrument movement.

4. An electrically operated visual display device comprising: a support frame having an apertured front wall member and an elongated member extending rearwardly relative to said front wall, an instrument movement having a moving coil and being supported on the rearwardly extending member, said moving coil being provided with a projection strip defining one or more projection characters, a projection lens system and a projection lamp, said projection lens system being supported by said rearwardly extending member and being optically disposed between said projection strip and said apertured front wall, a rear wall member secured to and disposed at right angles to said rearwardly extending member, a zero adjuster member coupled to said coil for positioning said projection strip relative to said front wall, said adjuster member having a portion thereof projecting through one of said wall members, and a condenser lens system supported by said rearwardly extending member and optically disposed between said projection strip and said projection lamp for optically projecting said projection character onto a viewing screen mounted in the aperture of said front wall, said projection character providing a visual indication of an electrical parameter dependent upon a current applied to said instrument movement.

5. An electrically operated visual indicating device comprising: a vertical front mounting plate provided with a viewing aperture, an elongated member extending between the front and rear ends of said device, mounting means positioned by said member in rearward relation to said front mounting plate, an instrument movement carried by said mounting means and having a moving coil supported with its axis of rotation substantially vertical, an arcuate scale strip carrying a number of characters for display, a scale carrier arm including a portion parallel to and radially offset from said coil axis for supporting said scale strip for rotation with said coil, and an optical projection system including lamp means and socket therefor positioned horizontally with respect to said front plate and in vertically displaced relation with respect to said instrument movement, said lamp means being readily removable endwise from said device, and condenser and projection lenses carried by said mounting means on opposite sides of said scale strip for projecting light from said lamp to form an image in said viewing aperture of a character on said scale strip lying in the optical path defined by said lenses.

6. An electrically operated visual indicating device comprising: a vertical front mounting plate provided with a viewing aperture; an elongated member extending between the front and rear ends of said device; mounting means positioned by said member in rearward relation to said front mounting plate; an instrument movement carried by said mounting means and having a moving coil supported with its axis of rotation substantially vertical; an arcuate scale strip carrying a number of characters for display; a scale carrier arm including a portion parallel to and radially offset from said coil axis for supporting said scale strip for rotation with said coil; an optical projection system including lamp means positioned horizontally with respect to said front plate and in vertically displaced relation with respect to said instrument movement, said lamp means being readily removable endwise from said device; condenser and projection lenses carried by said mounting means on opposite sides of said scale strip for projecting light from said lamp to form an image in said viewing aperture of a character on said scale strip lying in the optical path defined by said lenses; and a zero adjusting mechanism including a slotted arm carried by said instrument movement, an eccentric pin engaged in the slot of said slotted arm, and stud means accessible endwise from the exterior of said device and vertically displaced with respect to said lamp means for rotating said pin to adjust the position of said image in said viewing aperture.

References Cited by the Examiner

UNITED STATES PATENTS

| | | | |
|---|---|---|---|
| 2,175,185 | 10/1939 | Ellsworth | 88—24 |
| 2,369,248 | 2/1945 | Pratt | 88—24 |
| 2,502,829 | 4/1950 | Cozart | 40—77 |
| 2,562,297 | 7/1951 | Cordonnier | 88—24 |
| 2,850,942 | 9/1958 | Stevenson et al. | 88—24 |
| 3,132,558 | 5/1964 | Wymann | 88—24 |

FOREIGN PATENTS

| | | |
|---|---|---|
| 1,152,559 | 9/1957 | France. |
| 678,917 | 7/1939 | Germany. |
| 720,903 | 5/1942 | Germany. |

OTHER REFERENCES

Gossen: German application No. 1,098,219, pub. Jan. 26, 1961.

NORTON ANSHER, *Primary Examiner.*